(12) United States Patent
Pilcher

(10) Patent No.: US 12,528,223 B2
(45) Date of Patent: Jan. 20, 2026

(54) BATTERY-POWERED LOG SPLITTER ASSEMBLY AND METHOD THEREOF

(71) Applicant: NORTHERN TOOL & EQUIPMENT COMPANY, INC., Burnsville, MN (US)

(72) Inventor: Matthew R. Pilcher, Owatonna, MN (US)

(73) Assignee: NORTHERN TOOL & EQUIPMENT COMPANY, INC., Burnsville, MN (US)

( * ) Notice: Subject to any disclaimer, the term of this patent is extended or adjusted under 35 U.S.C. 154(b) by 265 days.

(21) Appl. No.: 18/235,493

(22) Filed: Aug. 18, 2023

(65) Prior Publication Data
US 2024/0066749 A1 Feb. 29, 2024

Related U.S. Application Data

(60) Provisional application No. 63/401,426, filed on Aug. 26, 2022.

(51) Int. Cl.
*B27L 7/06* (2006.01)
*B27L 7/00* (2006.01)

(52) U.S. Cl.
CPC .. *B27L 7/06* (2013.01); *B27L 7/00* (2013.01)

(58) Field of Classification Search
CPC .................................... B27L 7/00; B27L 7/06
USPC .................................. 144/193.1, 195.1, 366
See application file for complete search history.

(56) References Cited

U.S. PATENT DOCUMENTS

| | | |
|---|---|---|
| 2,851,072 A | 9/1958 | Gerjets et al. |
| 3,242,955 A | 3/1966 | Hellstrom |
| 3,371,724 A | 3/1968 | Crowell |
| 3,489,192 A | 1/1970 | Snyder |
| 3,596,691 A | 8/1971 | Broadfoot |
| 3,640,323 A | 2/1972 | Helle |
| 3,659,636 A | 5/1972 | Erikksson et al. |
| 3,670,789 A | 6/1972 | Long |
| 3,995,672 A | 12/1976 | Binninger |
| 4,086,111 A | 4/1978 | Corey |
| 4,091,851 A | 5/1978 | Ober |
| 4,116,251 A | 9/1978 | Graney |

(Continued)

FOREIGN PATENT DOCUMENTS

| | | |
|---|---|---|
| AT | 515182 A2 | 6/2015 |
| AU | 2008100777 A4 | 9/2008 |

(Continued)

*Primary Examiner* — Jared O Brown
(74) *Attorney, Agent, or Firm* — Taft Stettinius & Hollister LLP; Stephen F. Rost

(57) ABSTRACT

A log splitter includes a frame, one or more wheels for supporting the frame, and a tongue extending from the frame and including a hitch assembly. A hydraulic control system includes a hydraulic pump and a control valve. The log splitter includes an electric motor operably coupled to the hydraulic pump, and a cutter mechanism configured to perform a cutting operation. The cutter mechanism is operably controlled by the hydraulic control system to move between a retracted position and a cutting position. A power module includes a battery electrically coupled to the electric motor. A movement of the cutter mechanism between the retracted position and cutting position is operably driven by the electric motor.

16 Claims, 16 Drawing Sheets

(56) References Cited

U.S. PATENT DOCUMENTS

| | | |
|---|---|---|
| 4,170,911 A | 10/1979 | Ayers et al. |
| 4,176,698 A | 12/1979 | Ahlschlager et al. |
| 4,222,419 A | 9/1980 | Oliver |
| 4,239,069 A | 12/1980 | Zimmerman |
| 4,239,070 A | 12/1980 | Burns |
| 4,258,764 A | 3/1981 | Gerst |
| 4,284,112 A | 8/1981 | Hoskin |
| 4,294,295 A | 10/1981 | Olin |
| 4,313,480 A | 2/1982 | Pontelin |
| 4,317,476 A | 3/1982 | Radzik |
| 4,335,762 A | 6/1982 | Reaume et al. |
| 4,351,377 A | 9/1982 | Hamel |
| 4,357,973 A | 11/1982 | Pierrat |
| 4,377,190 A | 3/1983 | Pierrat |
| 4,378,036 A | 3/1983 | Williams |
| 4,396,047 A | 8/1983 | Balkus |
| 4,403,635 A | 9/1983 | York |
| 4,411,299 A | 10/1983 | Alcott |
| 4,423,759 A | 1/1984 | Seeger |
| 4,445,554 A | 5/1984 | Suzuki |
| 4,454,951 A | 6/1984 | Kuehn |
| 4,463,787 A | 8/1984 | Lenertz |
| 4,483,379 A | 11/1984 | Aikins et al. |
| 4,501,309 A | 2/1985 | Sinden |
| 4,559,985 A | 12/1985 | May |
| 4,609,018 A | 9/1986 | Barker |
| 4,625,782 A | 12/1986 | Jameson |
| 4,685,495 A | 8/1987 | Freeman |
| 4,700,759 A * | 10/1987 | Duerr .................. B27L 7/06 144/195.1 |
| 4,730,653 A | 3/1988 | Pantone et al. |
| 4,770,218 A * | 9/1988 | Duerr .................. B27L 7/06 144/195.1 |
| 4,782,870 A * | 11/1988 | Duerr .................. B27L 7/00 144/195.1 |
| 4,805,676 A | 2/1989 | Aikins |
| 4,878,524 A | 11/1989 | Rosenthal et al. |
| 4,951,726 A | 8/1990 | Sieverin |
| 4,961,452 A | 10/1990 | Hudson |
| 5,107,911 A | 4/1992 | Plakotaris |
| 5,243,901 A | 9/1993 | Green |
| 5,337,810 A | 8/1994 | McCormack |
| 5,460,211 A | 10/1995 | Minati |
| 5,535,795 A | 7/1996 | Bunn |
| 5,647,210 A | 7/1997 | Gustafsson |
| 5,803,141 A | 9/1998 | Patterson |
| 5,806,401 A | 9/1998 | Rajala et al. |
| 6,076,576 A | 6/2000 | Maddox et al. |
| 6,386,249 B1 | 5/2002 | Murphy |
| 6,546,976 B1 | 4/2003 | Hill |
| 6,609,547 B1 | 8/2003 | Machkovech |
| 7,011,123 B2 | 3/2006 | Peterson |
| 7,198,081 B2 | 4/2007 | Lewis et al. |
| 7,255,143 B1 * | 8/2007 | Babcock .................. B27L 7/06 144/195.1 |
| 7,334,615 B2 | 2/2008 | Paradise |
| 7,556,072 B2 | 7/2009 | Koch, Jr. |
| 7,640,955 B2 | 1/2010 | Tischer |
| 7,913,726 B1 | 3/2011 | Honnell |
| 7,934,524 B2 | 5/2011 | Priebe |
| 9,802,800 B2 | 10/2017 | Kalakay, Jr. |
| 9,840,022 B2 | 12/2017 | Rodler |
| 9,919,450 B2 | 3/2018 | Hu et al. |
| 10,023,093 B2 | 7/2018 | Banjo et al. |
| 10,076,851 B2 | 9/2018 | Manchik |
| 10,464,149 B2 | 11/2019 | Maki-Haapoja |
| 10,836,069 B2 | 11/2020 | Banjo et al. |
| 10,906,202 B2 | 2/2021 | Hutchinson et al. |
| 2003/0155037 A1 | 8/2003 | Alexander |
| 2013/0098503 A1 | 4/2013 | Shaeffer |
| 2016/0009532 A1 | 1/2016 | Bennette |
| 2016/0297095 A1 * | 10/2016 | Banjo .................. B27L 7/06 |
| 2018/0126582 A1 * | 5/2018 | Xin .................. B27L 7/06 |
| 2018/0297504 A1 * | 10/2018 | Banjo .................. B27L 7/00 |
| 2019/0001521 A1 | 1/2019 | Bindhammer |
| 2019/0111584 A1 * | 4/2019 | Carmen, Jr. .................. B27L 7/06 |
| 2022/0234242 A1 | 7/2022 | Coolbaugh |

FOREIGN PATENT DOCUMENTS

| | | |
|---|---|---|
| AU | 2019100403 A4 | 5/2019 |
| BR | PI8504829 A | 5/1987 |
| BR | 9100288 A | 9/1992 |
| CA | 1127053 A | 7/1982 |
| CA | 2768706 A1 | 8/2013 |
| CH | 217830 A | 11/1941 |
| CH | 315664 A | 8/1956 |
| CH | 690673 A5 | 12/2000 |
| CN | 201380530 Y | 1/2010 |
| CN | 203854078 U | 10/2014 |
| CN | 204566315 U | 8/2015 |
| CN | 107097319 A | 8/2017 |
| CN | 107139300 A | 9/2017 |
| CN | 107263656 A | 10/2017 |
| CN | 206765015 U | 12/2017 |
| CN | 207534967 U | 6/2018 |
| CN | 108372565 A | 8/2018 |
| CN | 108422521 A | 8/2018 |
| CN | 108515597 A | 9/2018 |
| CN | 108858548 A | 11/2018 |
| CN | 108927872 A | 12/2018 |
| CN | 108972808 A | 12/2018 |
| CN | 209478413 U | 10/2019 |
| CN | 210551944 U | 5/2020 |
| CN | 211073994 U | 7/2020 |
| CN | 211194247 U | 8/2020 |
| CN | 211278864 U | 8/2020 |
| CN | 112606148 A | 4/2021 |
| CN | 108098957 A | 6/2021 |
| CN | 108297231 A | 6/2021 |
| CN | 113664939 A | 11/2021 |
| CN | 215618742 U | 1/2022 |
| CN | 215749746 U | 2/2022 |
| CN | 216099479 U | 3/2022 |
| CN | 216328950 U | 4/2022 |
| DE | 8101098 U1 | 8/1981 |
| DE | 3034006 A1 | 4/1982 |
| DE | 8425864 U1 | 3/1985 |
| DE | 8434108 U1 | 4/1985 |
| DE | 3502653 A1 | 8/1985 |
| DE | 3415560 A1 | 11/1985 |
| DE | 9115379 U1 | 3/1992 |
| DE | 9201023 U1 | 7/1992 |
| DE | 4115838 A1 | 11/1992 |
| DE | 4239786 A1 | 6/1994 |
| DE | 9412658 U1 | 10/1994 |
| DE | 4427759 A1 | 2/1996 |
| DE | 29601139 U1 | 3/1996 |
| DE | 29722633 U1 | 3/1998 |
| DE | 19709511 A1 | 9/1998 |
| DE | 20219207 U1 | 3/2003 |
| DE | 202004016785 U1 | 2/2005 |
| DE | 202006014485 U1 | 11/2006 |
| DE | 102006054548 A1 | 5/2008 |
| DE | 102010018558 A1 | 11/2011 |
| DE | 202011100212 U1 | 12/2011 |
| DE | 202012005226 U1 | 7/2012 |
| DE | 102011100099 A1 | 10/2012 |
| DE | 102011110075 A1 | 2/2013 |
| DE | 202011107748 U1 | 2/2013 |
| DE | 202013004838 U1 | 7/2013 |
| DE | 102012204995 A1 | 10/2013 |
| DE | 102012016841 A1 | 2/2014 |
| DE | 202014102437 U1 | 8/2015 |
| DE | 102014110968 A1 | 2/2016 |
| DE | 202017006368 U1 | 1/2018 |
| DE | 102016226226 A1 | 6/2018 |
| DE | 202018105945 U1 | 2/2019 |
| DE | 202020003566 U1 | 10/2020 |
| DE | 102020126893 A1 | 4/2022 |
| EP | 0136017 A2 | 4/1985 |
| EP | 0718078 A1 | 6/1996 |
| EP | 0891845 A2 | 1/1999 |

(56) References Cited

FOREIGN PATENT DOCUMENTS

| | | |
|---|---|---|
| EP | 0901892 A2 | 3/1999 |
| EP | 0925889 A2 | 6/1999 |
| EP | 1153717 A1 | 11/2001 |
| EP | 1541307 A1 | 6/2005 |
| EP | 2279838 A2 | 2/2011 |
| EP | 2832510 A1 | 2/2015 |
| EP | 2264322 A2 | 5/2017 |
| EP | 3311966 A1 | 4/2018 |
| EP | 3332931 A1 | 6/2018 |
| EP | 3326770 A1 | 4/2020 |
| EP | 3885087 A1 | 9/2021 |
| ES | 1084856 U | 7/2013 |
| FR | 2462979 A1 | 2/1981 |
| FR | 2498515 A1 | 7/1982 |
| FR | 2519895 A1 | 7/1983 |
| FR | 2502273 A1 | 8/1985 |
| FR | 2661359 A1 | 10/1991 |
| FR | 2932113 A1 | 12/2009 |
| GB | 2556428 A | 5/2018 |
| IN | 202011013357 | 1/2021 |
| IT | 201900003361 A1 | 6/2019 |
| KR | 20100063401 A | 6/2010 |
| KR | 101272698 B1 | 6/2013 |
| KR | 20160017534 A | 2/2016 |
| NO | 327560 B1 | 8/2009 |
| RU | 2283221 C1 | 9/2006 |
| SE | 524089 C2 | 6/2004 |
| SE | 538510 C2 | 8/2016 |
| SI | 24385 A | 12/2014 |
| WO | 1998032576 A1 | 7/1998 |
| WO | 1999064214 A1 | 12/1999 |
| WO | 2005095072 A1 | 10/2005 |
| WO | 2007071814 A1 | 6/2007 |
| WO | 2007075905 A1 | 7/2007 |
| WO | 2008028578 A1 | 3/2008 |
| WO | 2008040535 A1 | 4/2008 |
| WO | 2010122225 A1 | 10/2010 |
| WO | 2015063663 A1 | 5/2015 |
| WO | 2015097571 A1 | 7/2015 |
| WO | 2016198738 A1 | 12/2016 |
| WO | 2017100822 A1 | 6/2017 |

\* cited by examiner

BATTERY-POWERED LOG SPLITTER ASSEMBLY AND METHOD THEREOF

RELATED APPLICATIONS

This application claims the benefit of U.S. Provisional Patent Application Ser. No. 63/401,426, filed Aug. 26, 2022, the disclosure of which is hereby incorporated by reference in its entirety.

FIELD OF THE DISCLOSURE

The present disclosure relates to a log splitter, and in particular, to a battery-powered log splitter.

BACKGROUND

There are known structures for splitting wood and other material Log splitters, for example, are in common use that supports a piece of wood such as a log between a ram or material holding device and a splitting blade. The material holding device or ram has a surface which engages one end of the material and moves the log into contact with a sharp edge of the splitting blade and continues the movement of the log relative to the blade to effect a splitting of the log. In most conventional log splitters, gas or other type of fuel is used for splitting material. These gas-powered splitters can be expensive and require maintenance including, but not limited to, oil changes, air filter changes and fuel additions.

Gas-powered splitters are noisy and difficult to transport. With time, fuel consumption of the gas-powered splitters increases which is expensive, which can be harmful to the environment.

Conventional electric log splitters require electric cords which can be prohibitive for an effective log splitting operation, for example, remote from common power sources. Further, electric corded log splitters may provide low power performance.

Thus, there is a desire for an improved log splitter which is easier to transport and operates more cleanly than gas-powered log splitters. There is also a desire for an improved log splitter which does not require a cord to plug into a power source which can otherwise be inconvenient when using the log splitter.

SUMMARY

In a first implementation of the present disclosure, a log splitter includes a frame, one or more wheels for supporting the frame, and a tongue extending from the frame and including a hitch assembly. A hydraulic control system includes a hydraulic pump and a control valve. The log splitter includes an electric motor operably coupled to the hydraulic pump, and a cutter mechanism configured to perform a cutting operation. The cutter mechanism is operably controlled by the hydraulic control system to move between a retracted position and a cutting position. A power module includes a battery electrically coupled to the electric motor. A movement of the cutter mechanism between the retracted position and cutting position is operably driven by the electric motor.

In one example of this implementation, the power module includes a controller electrically powered by the battery. In a second example, the power module includes a housing for enclosing the battery. In a third example, the power module includes a control interface including a battery charge level indicator, a charging port, and one or more controls. In a fourth example, the one or more controls includes a power control and a mode control. In a fifth example, the mode control includes an economy mode and a performance mode.

In a sixth example, the hydraulic control system includes a reservoir for holding hydraulic fluid, a hydraulic actuator coupled to the cutter mechanism, and the pump. In a seventh example, a control valve includes a first port, a second port, and a third port, the third port being a bypass port fluidly coupled to the reservoir. In an eighth example, an operator control mechanism is operably coupled to the control valve for controlling the control valve to direct hydraulic fluid from the pump to either the first port or the second port. In a ninth example, when the control valve is operably moved to direct hydraulic fluid to the first port, the cutter mechanism is actuated to move to the cutting position. In a tenth example, when the control valve is operably moved to direct hydraulic fluid to the second port, the cutter mechanism is actuated to move to the retracted position.

In another example, when the cutter mechanism is moved to the retracted position, the cutter mechanism is moved into a housing. In a further example, a holder mechanism is coupled to the frame for holding an object to be engaged by the cutter mechanism.

In another implementation of the present disclosure, a log splitter is operably configurable between a first configuration and a second configuration. The log splitter includes a frame comprising a first portion and a second portion, one or more wheels for supporting the frame, a tongue extending from the frame and including a hitch assembly, a hydraulic control system including a hydraulic pump and a control valve, an electric motor operably coupled to the hydraulic pump, a cutter mechanism configured to perform a cutting operation, the cutter mechanism operably controlled by the hydraulic control system to move between a retracted position and a cutting position, a power module comprising a battery electrically coupled to the electric motor, a pivot located between the first portion and the second portion of the frame, the first portion being releasably pivotable relative to the second portion about the pivot, wherein, the wedge is movably coupled to the first portion of the frame, wherein, a movement of the cutter mechanism between the retracted position and cutting position is operably driven by the electric motor, wherein, in the first configuration, the first portion is aligned coaxially or parallel to the second portion, and in the second configuration, the first portion is oriented perpendicularly with respect to the second portion.

In one example of this implementation, the power module includes a controller electrically powered by the battery, a housing for enclosing the battery, a control interface including a battery charge level indicator, a charging port, and one or more controls. In a second example, the hydraulic control system includes a reservoir for holding hydraulic fluid, a hydraulic actuator coupled to the cutter mechanism, and the pump, the hydraulic actuator being coupled to the first portion. In a third example, a control valve includes a first port, a second port, and a third port, the third port being a bypass port fluidly coupled to the reservoir, wherein the control valve is coupled to the first portion of the frame. In a fourth example, an operator control mechanism is operably coupled to the control valve for controlling the control valve to direct hydraulic fluid from the pump to either the first port or the second port.

In another example, when the control valve is operably moved to direct hydraulic fluid to the first port, the cutter mechanism is actuated to move to the cutting position. In a further example, when the control valve is operably moved to direct hydraulic fluid to the second port, the cutter mechanism is actuated to move to the retracted position.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
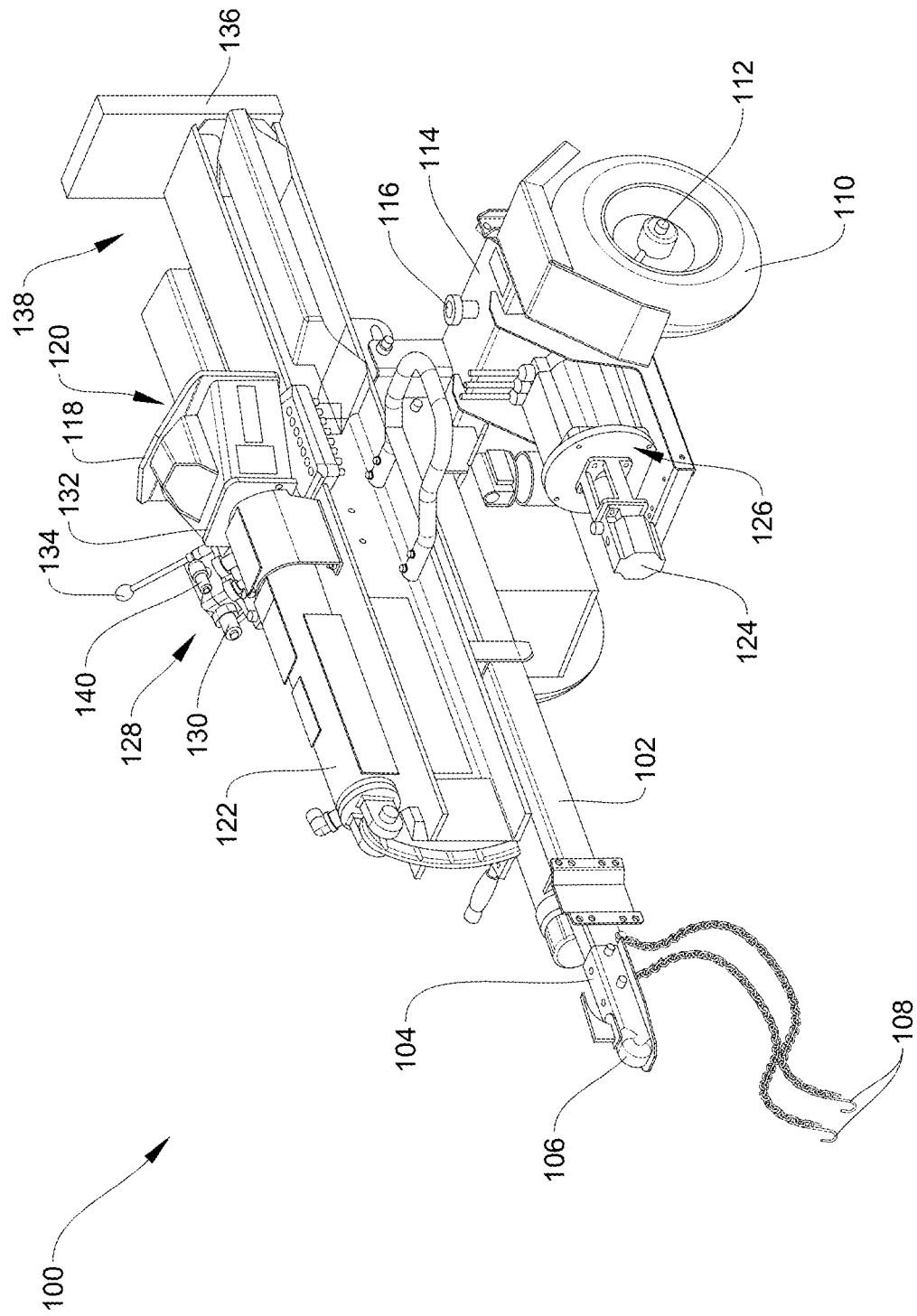
FIG. 1 is a front right perspective view of a log splitter assembly.

Referring to FIG. 1, a log splitter assembly 100 is shown. The log splitter assembly 100 may be operably controlled for splitting or cutting wood or other material. In one embodiment, the log splitter assembly 100 may cut a larger piece of material such as wood into two or more smaller pieces of material. The log splitter assembly 100 may include a frame 102 or chassis supported by one or more wheels 110. In FIG. 1, there is a pair of wheels 110 on either side of the frame 102. In other embodiments, there may be additional wheels 110. The wheels 110 may be aligned along an axle 112 as shown. The wheels 110 are configured to rotate about the axle 112 to allow the log splitter assembly 100 to be mobile and transportable.

In FIG. 1, the log splitter assembly 100 may include a tongue 104 extending from the frame 102 and terminating at a hitch assembly 106. The hitch assembly 106 may include a ball receiver configured for receiving a ball on a vehicle or other transport machine. In this manner, the log splitter assembly 100 may be towed from one location to another location. Chains 108 may be provided at or near the hitch assembly 106 for securely coupling to the vehicle or transport machine (not shown).

Figure 8:
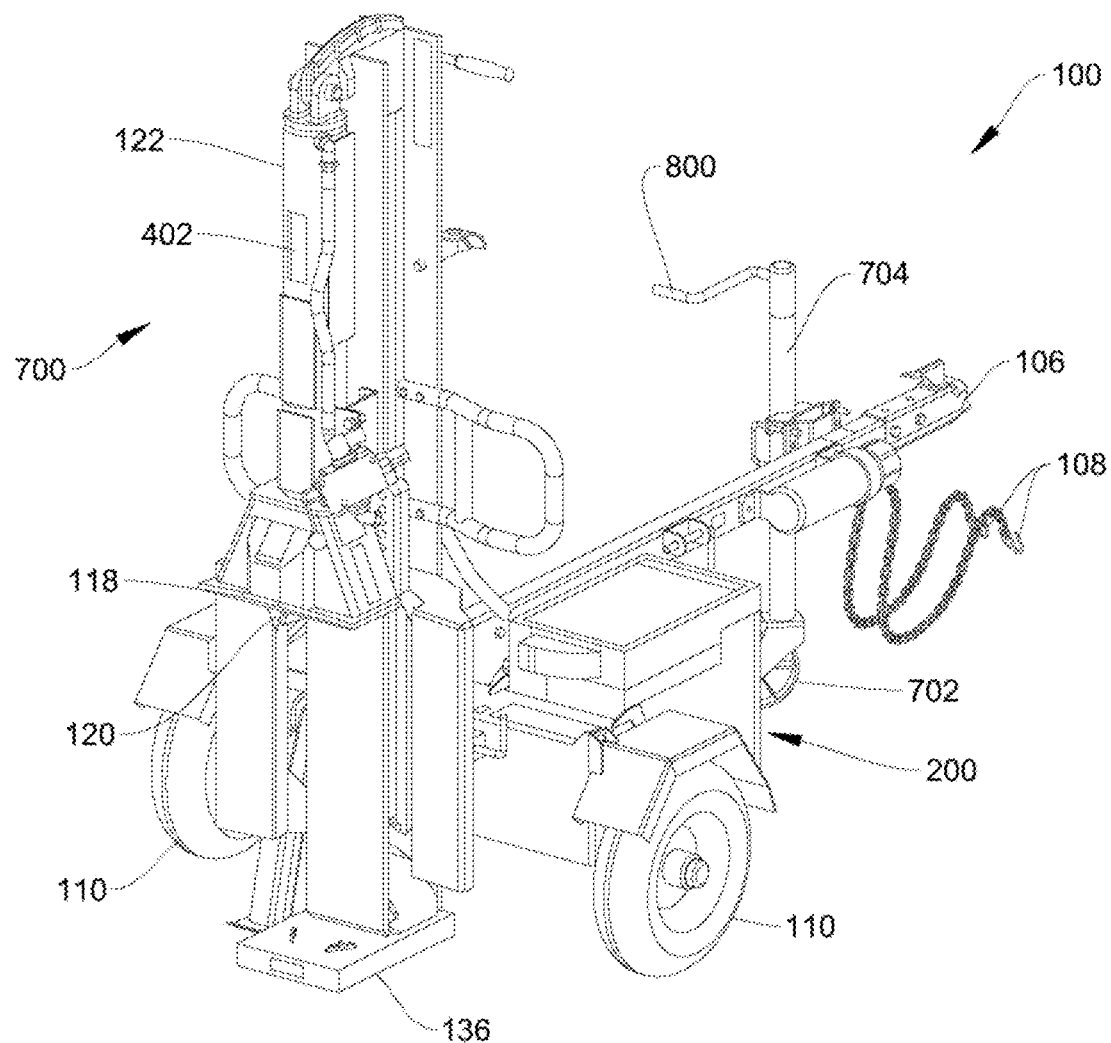
FIG. 8 is a rear left perspective view of the log splitter assembly of FIG. 1 in the second position.

The log splitter assembly 100 may include a hydraulic control system for controlling the actuation of a hydraulic cylinder or actuator for splitting or cutting material. The hydraulic actuator may be supported by the frame 102 as shown in FIG. 1. In this embodiment, the hydraulic actuator may include a base 122 through which a rod or actuator travels via hydraulic pressure. As the rod or actuator (not shown) is hydraulically actuated, a wedge cutter 120 may move in an axial direction for either cutting material or being retracted from the material. The wedge cutter 120 is shown in FIG. 8. The wedge cutter 120 may include a shape or structure conducive for cutting or splitting material such as wood.

The hydraulic control system may include a tank 114 or reservoir for holding hydraulic fluid such as oil. The tank 114 may include a cap 116 where fluid may be dispensed into the tank 114 or removed therefrom. The hydraulic control system may also include a hydraulic pump 124 which receives hydraulic fluid from the tank 114.

The hydraulic pump 124 may be operably driven by an electric motor 126 to deliver hydraulic fluid to a control valve 128. The control valve 128 may include at least a first port 130 and a second port 132. In the embodiment of FIG. 1, the control valve 128 may also include a bypass port 140, which will be described in further detail below.

The control valve 128 may be operably controlled via a manual control. In FIG. 1, an operator control 134 in the form of a lever is shown. In other embodiments, the operator control 134 may be a knob, switch, push button, or other type of control. As the operator control 134 is moved, the control valve 128 may be actuated to direct hydraulic fluid from the pump 124 to either the first port 130 or the second port 132. As hydraulic fluid flows to the first port 130, the wedge cutter 120 may be extended in an axial direction away from the base 122 to perform a cutting operation. As hydraulic fluid flows to the second port 132, the wedge cutter 120 may be retracted into the base 122 of the hydraulic actuator. A housing 118 may be coupled to the frame 102 and/or base 122 of the actuator as shown in FIGS. 1-2 and 4-5. The housing 118 may at least partially enclose the wedge cutter 120 in its retracted position. As the wedge cutter 120 performs a cutting operation, it is possible wood or other material may be stuck thereto. As the wedge cutter 120 retracts, the wood or other material may engage the housing 118 and become dislodged from the wedge cutter 120.

During a cutting operation, the log splitter assembly 100 may include a holder mechanism 136 whereby material such as wood may be positioned. The material may be disposed in a cutting area 138 defined between the housing 118 and the holder mechanism 136 so that the material is aligned with the wedge cutter 120.

While the embodiment of FIG. 1 describes a hydraulic control system including a tank, a hydraulic pump, a hydraulic control valve, and a hydraulic actuator, in other embodiments the log splitter assembly may be an electrically driven system whereby the actuator is electrically driven. For example, an electric actuator may be operably controlled via an electronic controller and electric motor to actuate the wedge cutter 120 during a cutting operation. In yet other embodiments, a pneumatic actuator may be used for actuating the wedge cutter 120 to perform the cutting operation. In a further embodiment, the actuator may be a mechanical actuator, an electric actuator, a hydraulic actuator, a pneumatic actuator, or a combination thereof.

Figure 2:
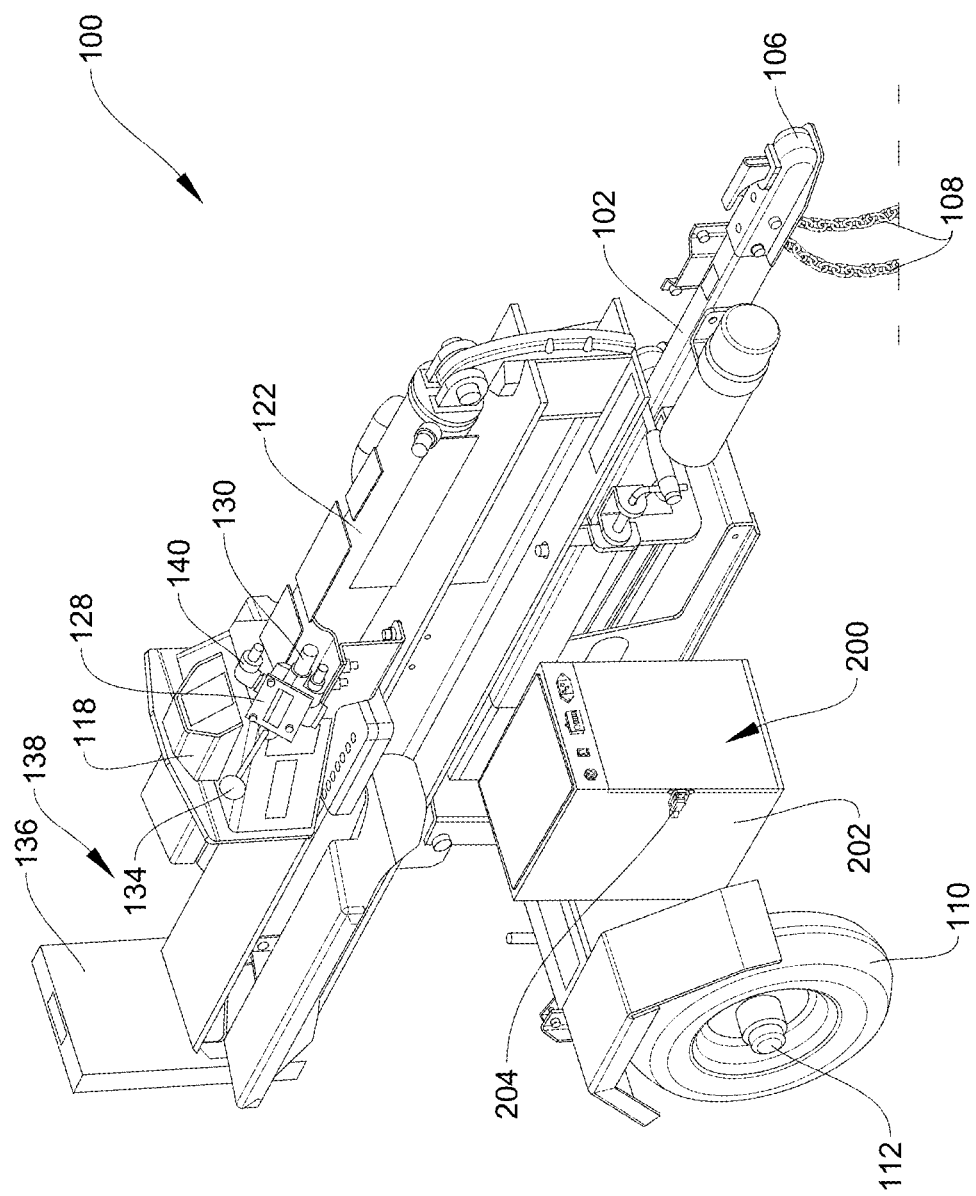
FIG. 2 is a front left perspective view of the log splitter assembly of FIG. 1.
Figure 3:
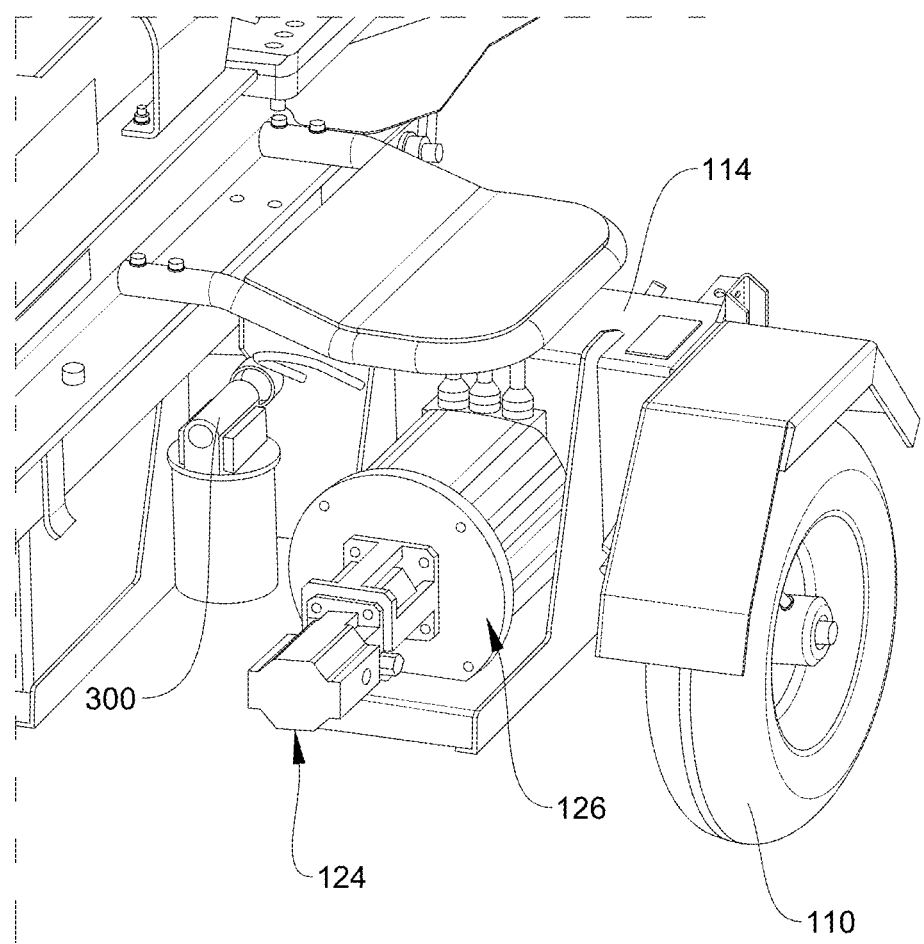
FIG. 3 is a partial perspective view of the log splitter assembly of FIG. 1.

In FIG. 2 of the present disclosure, the log splitter assembly 100 may include a power module 200. The power module 200 may comprise an outer housing 202 or casing with a latch assembly 204 for releasably latching a door 900 (see FIG. 9) in a closed position to the housing 202. The power module 200 will be described in further detail below.

Referring to FIGS. 1-6, the log splitter assembly 100 may include a return port 300 which is fluidly coupled to the tank 114. The return port 300 may also be fluidly coupled via a return line 404 in the form of a hose to the bypass port 140. The operator control 134 may position the control valve 128 in a bypass position so that hydraulic fluid from the pump 124 may be directed through a bypass channel to the bypass portion 140 and back to the tank 114 via the return line 404 and return port 300. In this manner, hydraulic fluid is not directed to either the first or second ports.

Figure 4:
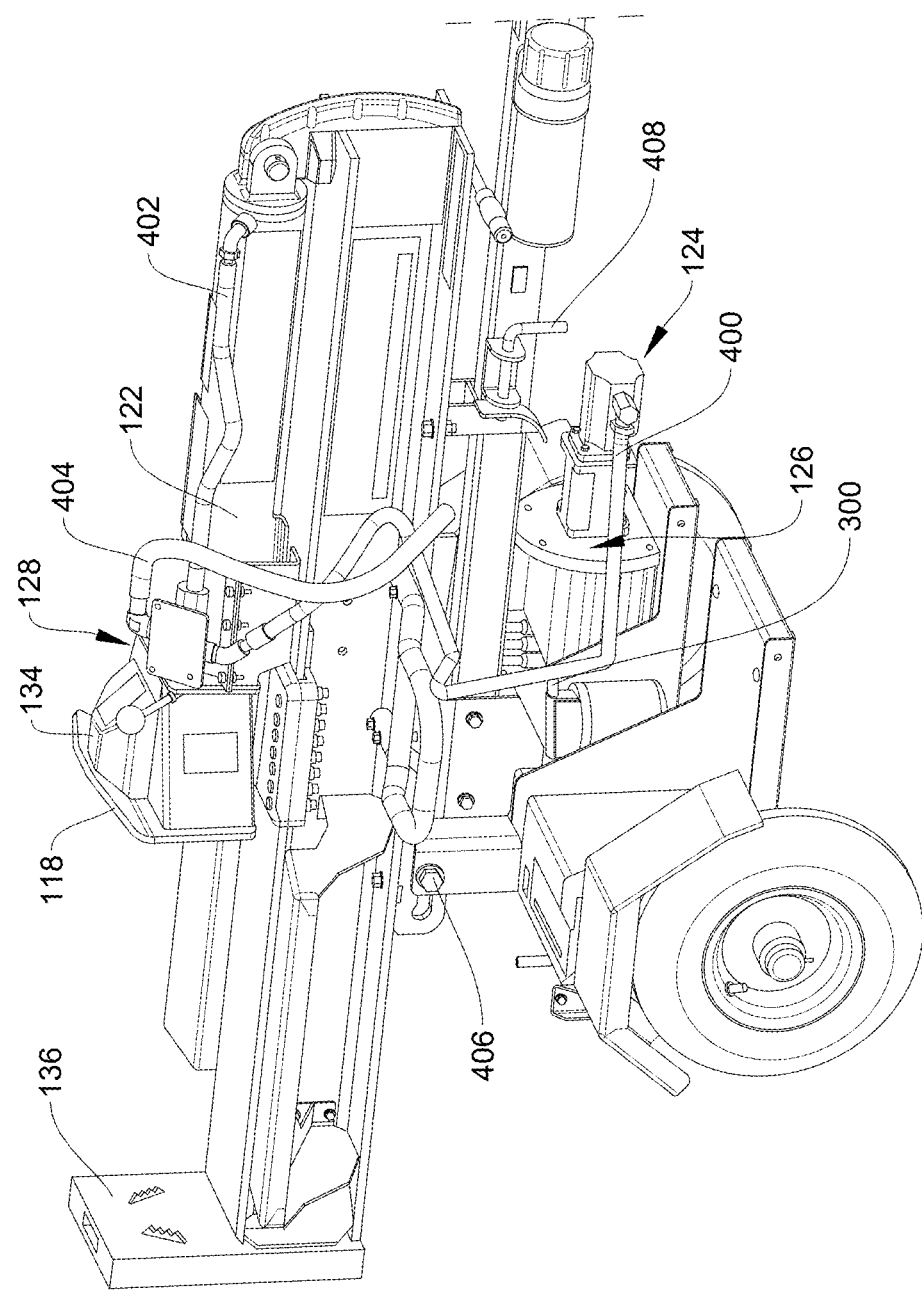
FIG. 4 is another front left perspective view of the log splitter assembly of FIG. 1.
Figure 5:
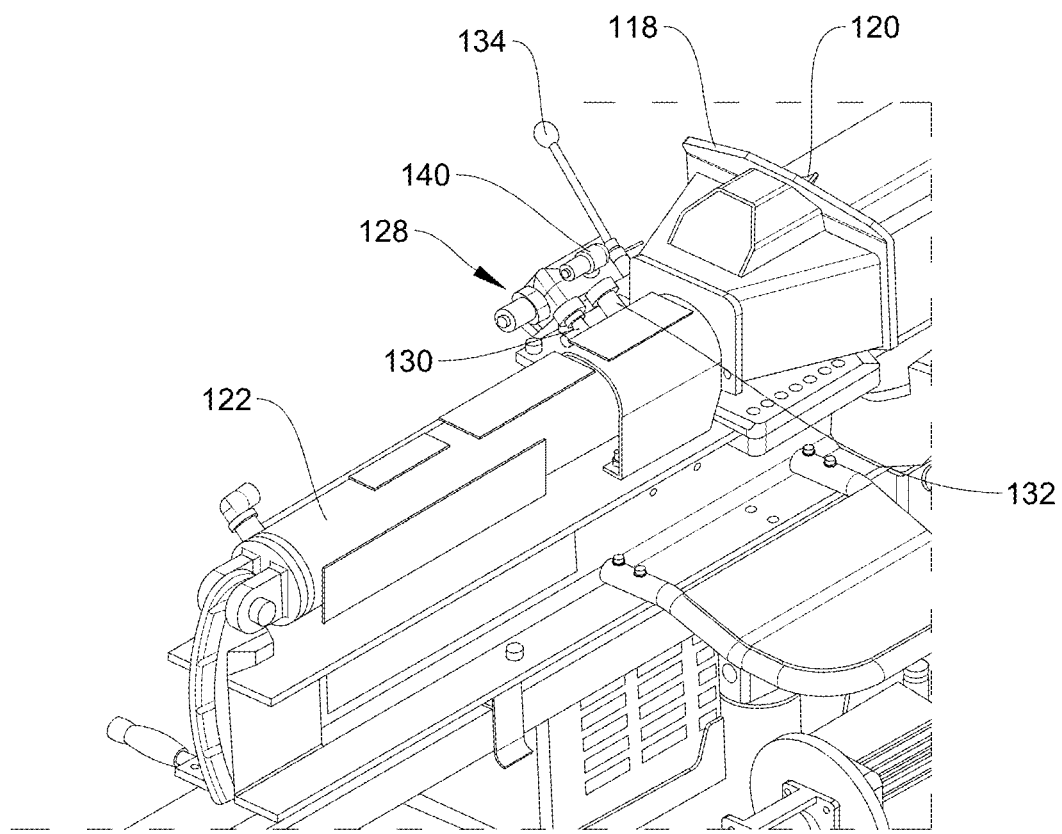
FIG. 5 is a partial perspective view of the log splitter assembly of FIG. 1.

As shown in FIG. 4, a supply line 400 in the form of a hose may be coupled between an output of the hydraulic pump 124 and the control valve 128. In this arrangement, hydraulic fluid may be pumped from the pump 124 to the control valve 128 via the supply line 400. A feed line 402 in the form of another hose may be coupled between the second port 132 of the control valve 128 and a port at an opposite end of the actuator to direct fluid into the base 122 thereof to retract the wedge cutter 120 from its extended position.

Figure 6:
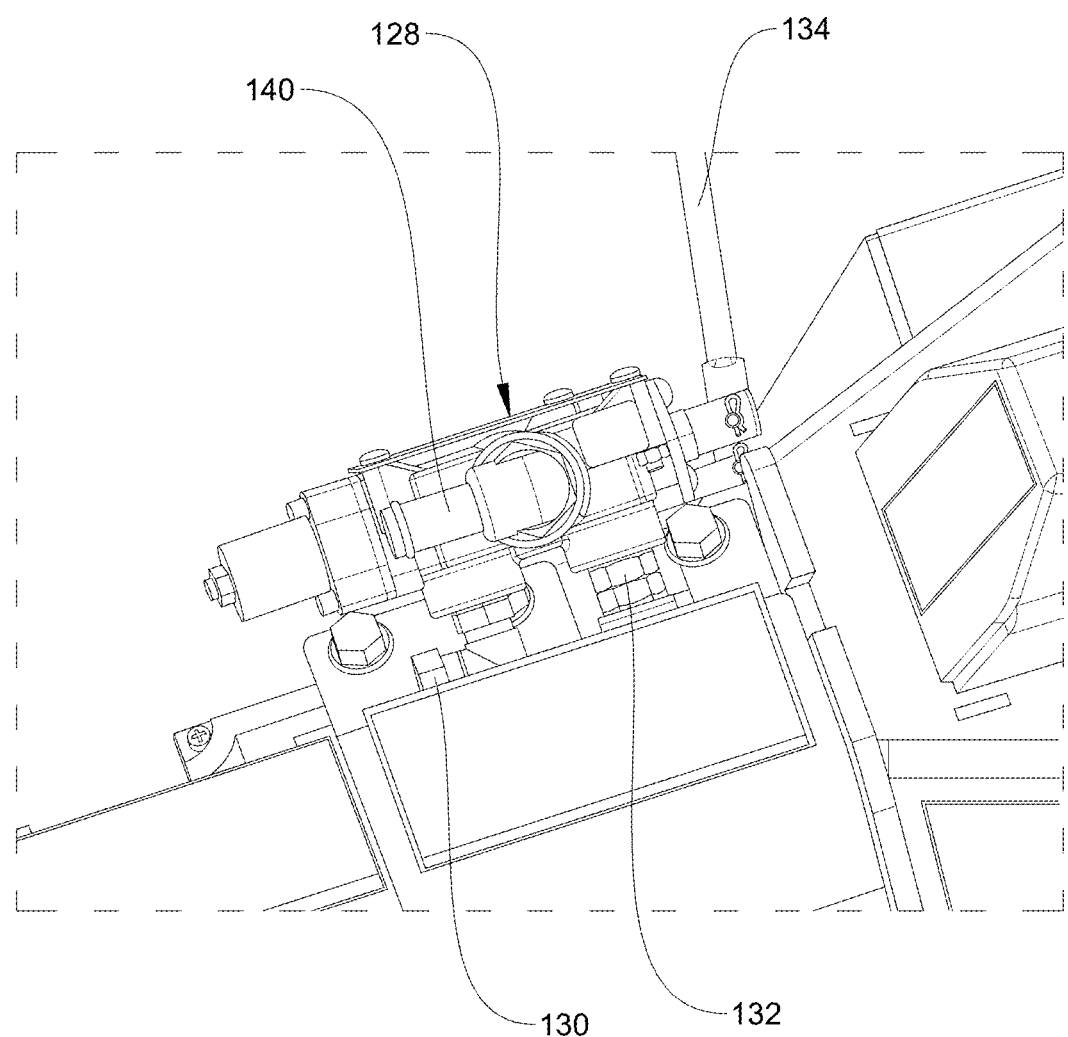
FIG. 6 is a top view of a control valve of the log splitter assembly of FIG. 1.

In the embodiment shown in FIG. 6, the first port 130 may be coupled directly to the control valve 128 such that hydraulic fluid supplied via the supply line 400 to the control valve 128 may be directed through the first port 130 to extend the wedge cutter 120. At least in this embodiment, a hose or other line is not required for fluidly coupling the control valve 128 to the first port 130. Instead, a separate hose or fitting may be coupled between the first port 130 and the end of the hydraulic actuator opposite the second port 132. However, in other embodiments, the first port 130 may be coupled directly to the base 122 opposite the second port 132 such that a hose or other type of line may be fluidly coupled between the first port 130 and the control valve 128.

In FIGS. 1-5, the log splitter assembly 100 is shown arranged in a first configuration. In the first configuration, the log splitter assembly 100 is disposed in a substantially horizontal orientation such that the wedge cutter 120 may travel along a substantially horizontal axis during the cutting operation. The log splitter assembly 100, however, may be reconfigured into a second configuration whereby the wedge cutter 120 may travel along a substantially vertical axis during the cutting operation. To reconfigure the log splitter assembly 100, a release latch 408 may be provided. The release latch 408 may releasably couple an upper portion of the frame 102 including the actuator, wedge cutter 120, and control valve 128 to a lower portion of the frame 102. When the release latch 408 is triggered, the upper portion of the frame 102 may pivot about a pivot bolt 406. The pivot bolt 406 may define a pivot axis about which the upper portion of the log splitter assembly frame pivots relative to the lower portion thereof.

Figure 7:
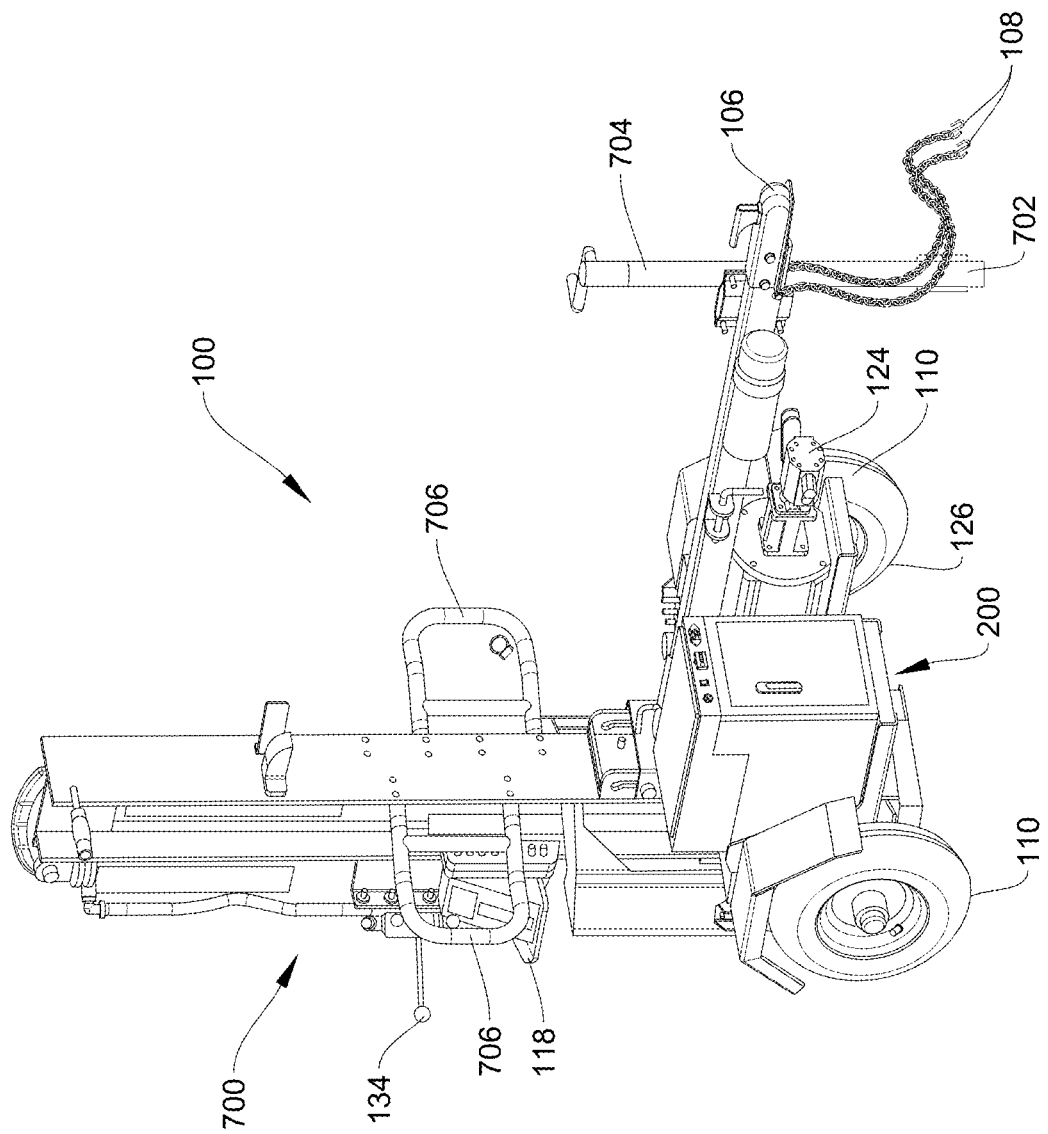
FIG. 7 is a front left perspective view of the log splitter assembly of FIG. 1 in a second position.

Referring to FIGS. 7 and 8 of the present disclosure, the log splitter assembly 100 may be configured in the second configuration 700 such that the wedge cutter 120 is actuated in a substantially vertical direction. The holder mechanism 136 may offer support upon which the upper portion of the frame 102 may rest against a surface such as the underlying ground. This is shown best in FIG. 8. A heavier piece of material may be positioned between the wedge cutter 120 and the holder mechanism 136 in advance of the cutting operation.

As shown in FIGS. 7 and 8, the frame 102 may also include a support leg 704 which may be supported on an underlying surface by a caster wheel 702. The support leg 704 may be raised or lowered via a handle 800 which may function similar to a crank handle. The support leg 704 may be raised such that the caster wheel 702 is raised above and out of contact with the underlying surface via the handle 800. Once it is raised and out of contact with the underlying surface, it may be possible to pivot the support leg and latch or otherwise position it in alignment with the tongue 104 and frame 102 of the log splitter assembly 100.

In FIG. 7, the log splitter assembly 100 may include one or more handles 706 which a user or operator may use to move the log splitter assembly 100 manually. Moreover, the one or more handles 706 may be grasped by the operator during the cutting operation or as desired.

Referring now to FIGS. 9-13, the log splitter assembly 100 may be battery-powered to help conserve energy and operate the assembly in a cleaner, more environmentally-friendly manner. A typical gas engine may be replaced by an electric motor 126 as shown in FIG. 1. The electric motor 126 may be electrically powered via a battery 902 which is shown disposed in the outer housing 202. In one embodiment, the door 900 may seal the interior of the housing 202 from dirt, dust and other contaminants.

Figure 9:
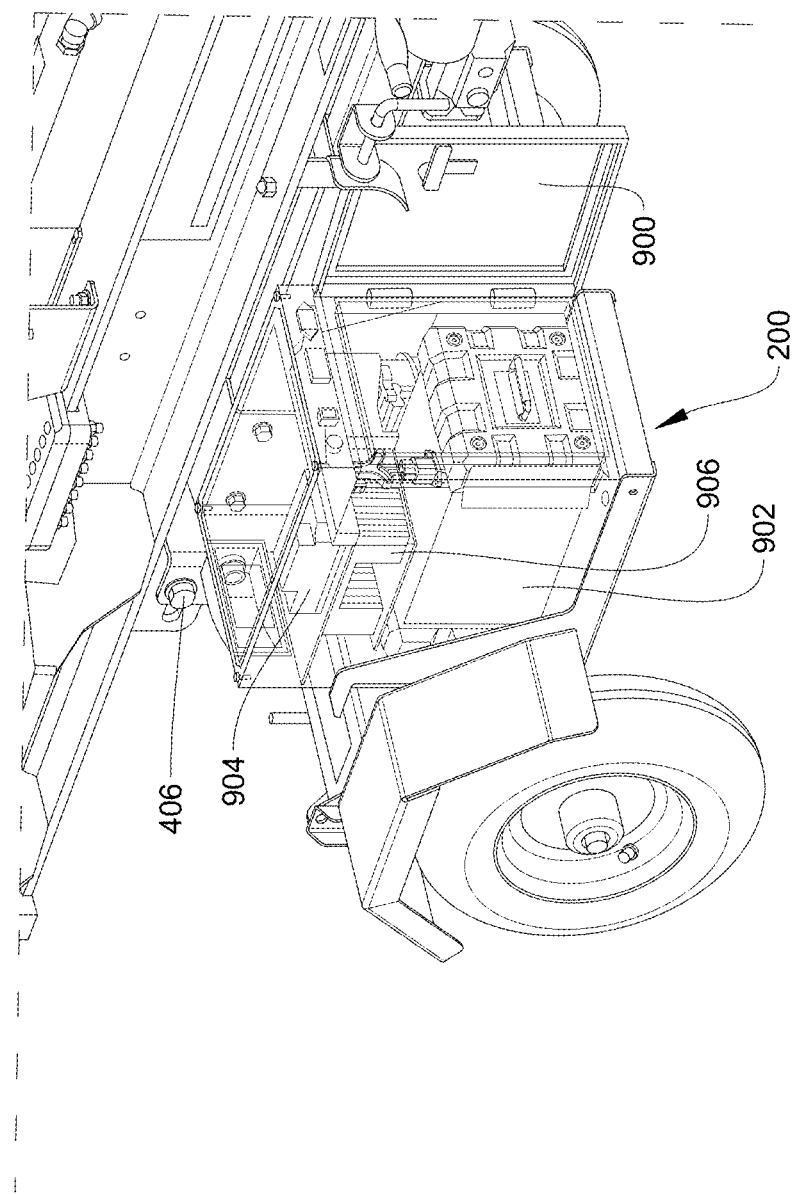
FIG. 9 is a perspective view of a power module of the log splitter assembly of FIG. 1.

A controller 904 may also be located in the housing 202 at a location adjacent the battery 902. The controller 904 may be powered by the battery 902. In the embodiment of FIG. 9, a heat sink 906 or other cooling mechanism may be provided to help cool or regulate the temperature of the battery 902 and controller 904. In FIG. 9, the outer housing 202 is shown in a transparent manner to allow the battery 902, controller 904 and heat sink 906 to be better visualized.

Figure 10:
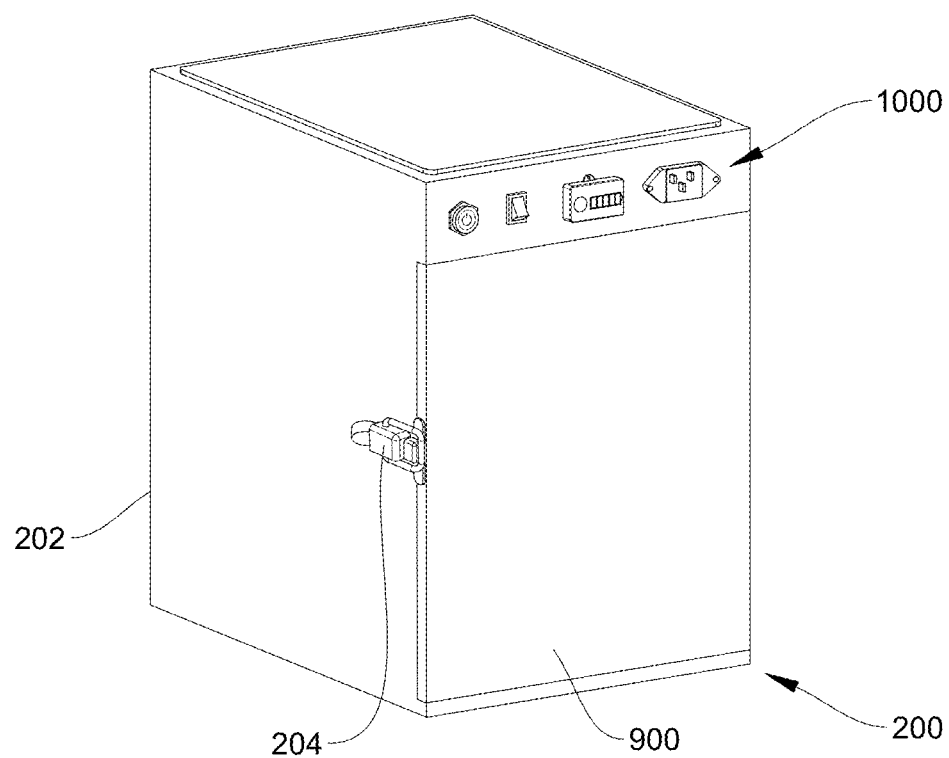
FIG. 10 is a perspective view of the power module.
Figure 11:
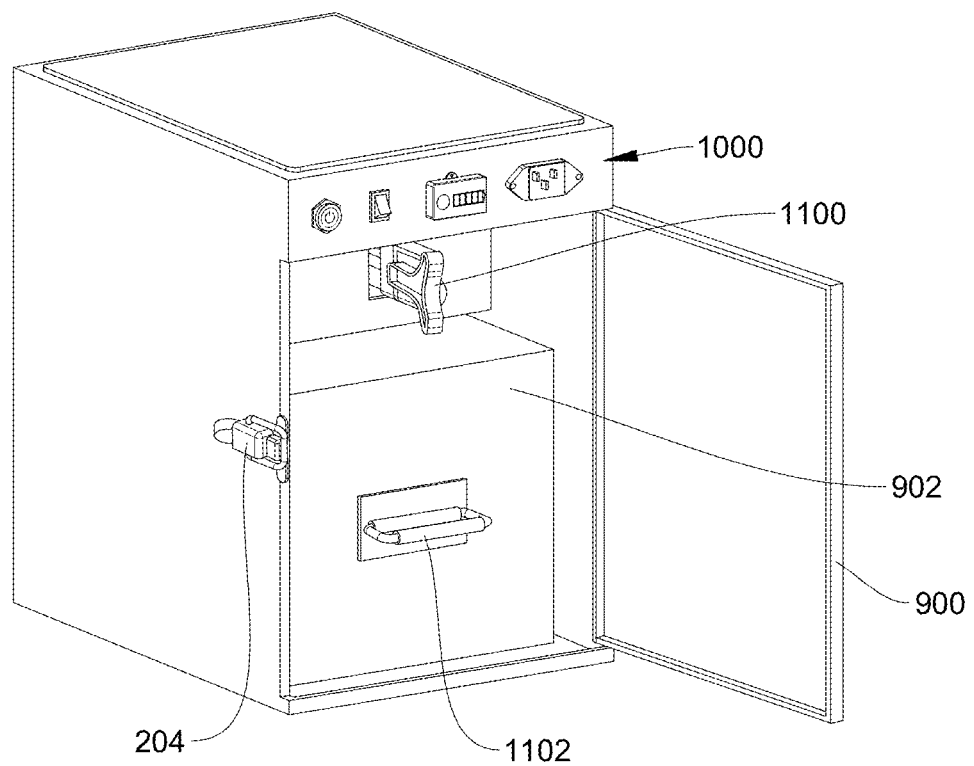
FIG. 11 is another perspective view of the power module.
Figure 12:
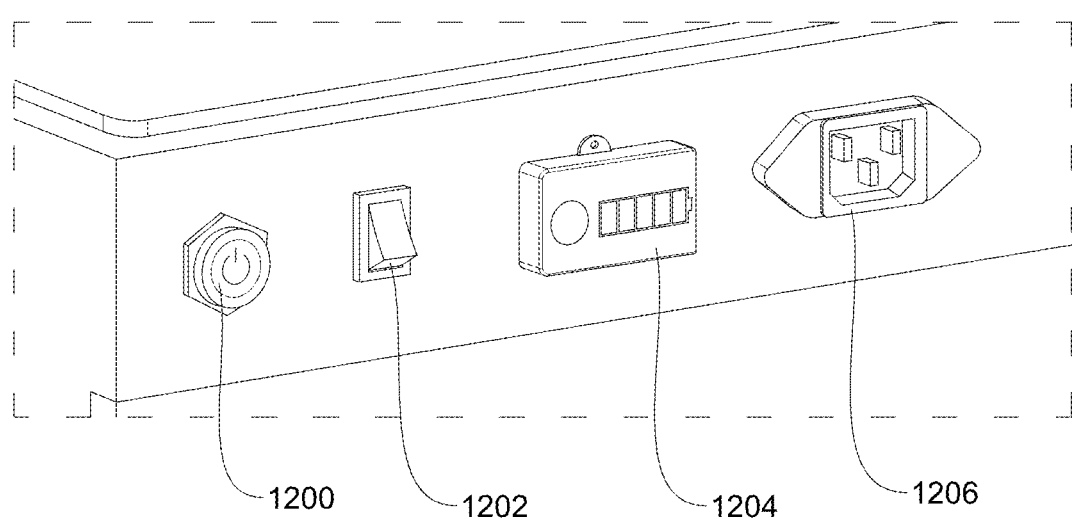
FIG. 12 is a perspective view of a control panel of the power module of FIG. 10.
Figure 13:
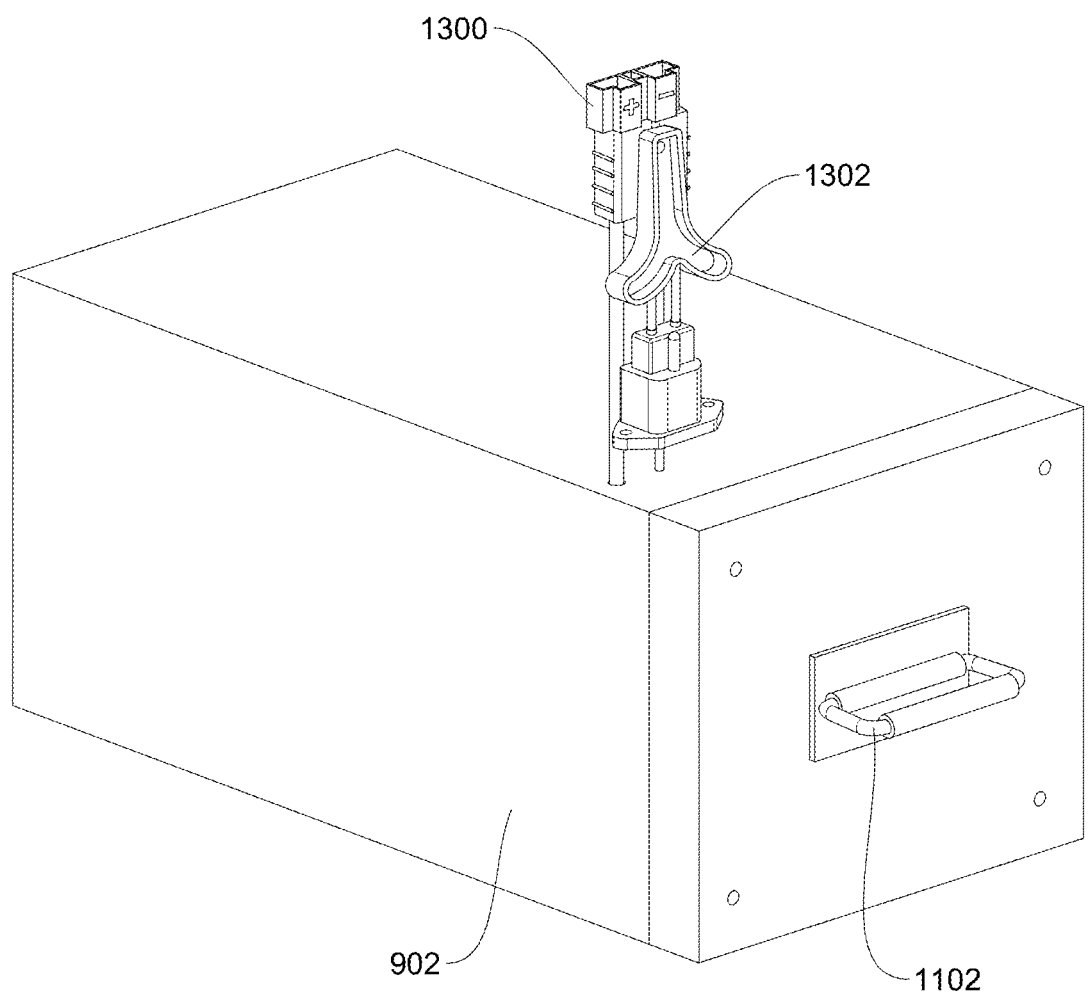
FIG. 13 is a perspective view of a battery of the power module.

The power module 200 may include a control panel or interface 1000 as shown in FIGS. 10-12. A battery connection terminal 1100 may also be provided as part of the power module 200. The battery 902 may include a handle 1102 to allow it to be removed or positioned within the outer housing 202 more easily. One or more connectors including a first connector 1300 and a second connector 1302 may extend from the battery 902 for coupling to the controller 904, a battery meter (not shown), etc.

Referring to FIG. 12, the control panel or interface 1000 may include a plurality of controls for controlling the performance of the log splitter assembly 100. A first control 1200 may include a master or main power control. The first control 1200 may determine if the battery 902 outputs any electrical power to the controller 904, battery meter (not shown), motor 126, etc. An operator may disable the battery 902 by triggering the first control 1200.

The control panel or interface 1000 may also include a second control 1202 for enabling or disabling an economy mode of the log splitter assembly 100. The log splitter assembly 100 may go unused for periods of time. If the second control 1202 is enabled, the controller 904 may operably shutdown the power from the battery 902 to the electric motor 126 to conserve the battery 902. In some instances, software may be stored or written in the controller 904 for performing this task automatically regardless of whether the second control is enabled. In other instances, if the second control 1202 is disabled, then the controller 904 may not shutdown the battery 902 until the second control 1202 is enabled.

The control panel or interface 1000 may include a battery charge level indicator 1204. A sensor (not shown) may be coupled to the battery 902 for detecting its charge status. The charge status may be communicated to the control panel via the indicator 1204. The sensor may be in communication with the controller 904 which in turn outputs the charge level via the indicator 1204.

As also shown in FIG. 12, a charging port 1206 may be provided on the control panel or interface 1000. In one embodiment, the charging port 1206 may be configured to allow the battery 902 to be charged without having to remove it from the power module 200. A charger (not shown) may be coupled to the charging port 1206 to facilitate the charging or re-charging of the battery 902. In an alternative embodiment, other electrically-powered devices may run off the battery power by connecting to the charging port 1206 or to another port not shown. The control panel may also display other information related to battery performance, motor performance, controller performance and the like.

Figure 14:
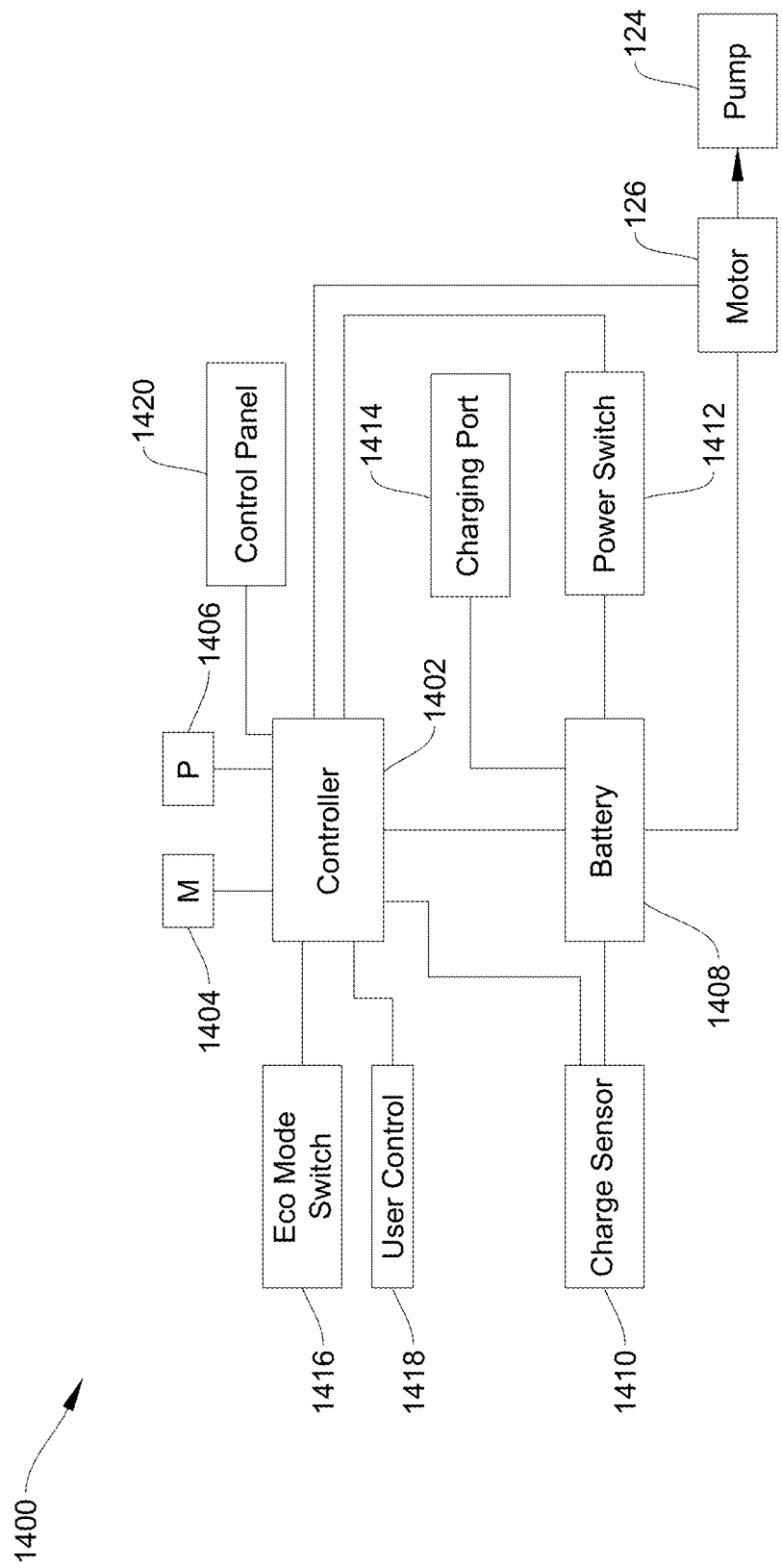
FIG. 14 is a diagram of a control system for controlling a log splitter assembly.

Turning to FIG. 14 of the present disclosure, one embodiment of a control system 1400 is shown for controlling a log splitter assembly. The control system 1400 may include a controller 1402 having a memory unit 1404 and a processor 1406. The memory unit 1404 may be capable of storing control logic, software, algorithms, look up tables, a set of instructions, and the like. The processor 1406 may be capable of executing the control logic, software, algorithms, look up tables, set of instructions, etc. stored by the memory unit 1404. In some embodiments, the controller 1402 may be similar or the same as the controller 904 of FIG. 9.

The controller 1402 may be electrically powered by a battery 1408. The battery 1408 may be similar or the same as the battery 902 of FIG. 9. A charge sensor 1410 may form part of the control system 1400 capable of detecting a current charge status of the battery 1408. The sensor 1410 may be in communication with the controller 1402 for providing the current charge status of the battery 1408. The controller 1402 may be in communication with a control panel 1420 such as the control panel 1000 of FIG. 10 where it is able to display or otherwise communicate the current charge status of the battery 1408 to an operator or user.

In some embodiments, the controller 1402 may be in communication with a transmitter (not shown) over a wireless network such as Wi-Fi or the like. The controller 1402 may be able to communicate to a remote device such as a cell phone, tablet, laptop, or other computer system via the transmitter and wireless network. In doing so, the controller 1402 may be able to communicate the battery charge status and other details about the control system 1400 or the functioning of the log splitter assembly 100. Other sensors may detect performance characteristics of the log splitter assembly including performance of the hydraulic pump 124, electric motor 126, and operation of the control valve 128, hydraulic actuator, etc. These performance characteristics may be communicated to the controller 1402 which in turn may communicate these characteristics to the control panel 1420 or to a remote device over the wireless network. In several embodiments, a user may have an application on their remote device which receives communications from the controller 1402 regarding charge status, performance characteristics, and the like.

The control system 1400 may include a charging port 1404 similar to the charging port 1206 of FIG. 12. The charging port 1404 may be used for coupling to another charge supply device for charging or re-charging the battery 1408. In other embodiments, the charging port 1404 may be configured for charging another electronic device or provide electrical power to operate another device such as a saw, trimmer, etc.

A power switch 1412 may be provided as part of the control system 1400 for energizing or de-energizing the controller 1402 and other components. A user may trigger the power switch to allow the controller 1402 and electric motor 126 to receive electrical power from the battery 1408.

The control system may also include an economy mode switch 1416 similar to or the same as the switch 1202 in FIG. 12. The economy mode switch 1416 may be on the control panel 1420 similar to that in FIG. 12, or it may be remote therefrom. In some embodiments, a user may have an application on a remote device such as a cell phone where they can trigger the power switch 1412 and economy mode switch 1416 remote from the log splitting assembly 100.

The control system 1400 may include one or more user controls 1418 in addition to the power switch 1412 and economy mode switch 1416. The one or more user controls 1418 may be in communication with the controller 1402 to control outputs therefrom. In several embodiments, the user controls 1418 may allow a user to send instructions to adjust or provide new control logic to be executed by the processor 1406. This may include, but is not limited to, motor torque, motor speed, pump output speed, control of the control valve, etc.

In some embodiments, a user may be able to provide instructions to the controller 1402 via the user controls 1416 to adjust performance of the economy mode. For example, a user may set a time limit of inactivity whereby after a certain length of time where the hydraulic actuator does not stroke between a retracted position and an extended position, the controller 1402 may shutdown the log splitter assembly 100. In one embodiment, the time delay or period of time of inactivity may be several minutes (e.g., between 1-15 minutes). In another embodiment, the time delay or period of inactivity may be less than one minute. In a further embodiment, the time delay or period of inactivity may be less than 45 seconds. In yet a further embodiment, the time delay or period of inactivity may be less than 30 seconds. The time delay or period of inactivity may be set in the control logic stored in the memory unit 1404 of the controller 1402. The controller 1402 may include a timer or clock by which it measures the time delay or period of inactivity.

The time limit may be one of several performance characteristics which may be adjusted via the user controls 1418. In another example, the user may disable the automatic triggering of economy mode and only allow such control to be made manually by the operator/user via the economy mode switch 1416. In other examples, the user may communicate to the controller 1402 that switching to the economy mode may be manually or automatic. In yet another example, the operator/user may communicate to the controller that during economy mode, rather than executing a complete electrical shutdown of the overall system 1400, the controller 1402 should disable one or more electrical components in order to only power a certain percentage (e.g., 25%, 50%, 75%, etc.) of the control system 1400. In this reduced power setting, the battery 1408 may still output electrical power to some of the electrical components but not all so as to save battery charge.

Figure 15:
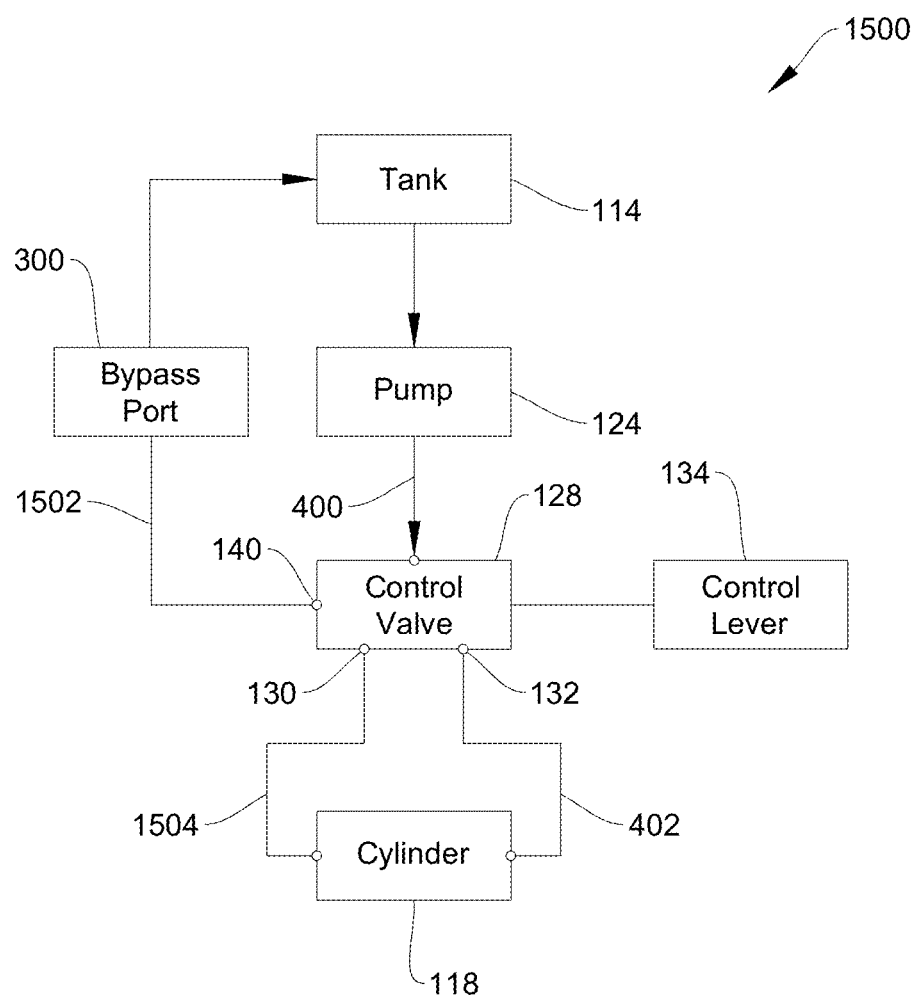
FIG. 15 is a diagram of a hydraulic system for controlling a log splitter assembly.

In FIG. 15 of the present disclosure, a hydraulic control system 1500 of the log splitter assembly 100 is disclosed.

The hydraulic system 1500 may include the tank 114, pump 124, control valve 128, actuator/cylinder, and bypass port 300. The control valve 128 may include the first port 130 and second port 132. As also shown, hydraulic fluid may be supplied from the control valve 128 to the actuator via a second feed line 1504. Fluid flowing through the second feed line 1504 may retract the wedge cutter 120 from a cutting operation. The hydraulic control system 1500 may also include a bypass circuit 1502 in which fluid may flow from the control valve 128 and return via the bypass port 300 to the tank 114.

As shown in FIG. 15, the control lever 134 is shown in communication with the control valve 128 to control the flow of fluid through the control valve 128 to either the actuator/cylinder or the bypass circuit 1502 back to the tank 114. In some embodiments, the control of hydraulic fluid through the control valve 128 may be controlled electronically via the controller 1402.

In one embodiment of the present disclosure, a log splitter assembly may be configured to produce a 20 ton or greater splitting force in either a horizontal or vertical direction. The log splitter assembly may be towed on a highway or other roadway and therefore is transportable. In one embodiment, the log splitter assembly may include a 60V DC nominal electrical system having a brushless DC electric motor and a 30Ah lithium iron phosphate (LFP) battery. In other embodiments, the size and function of the electrical system may differ as well as the amount of force capable of being exerted to split wood or other material.

Figure 16:
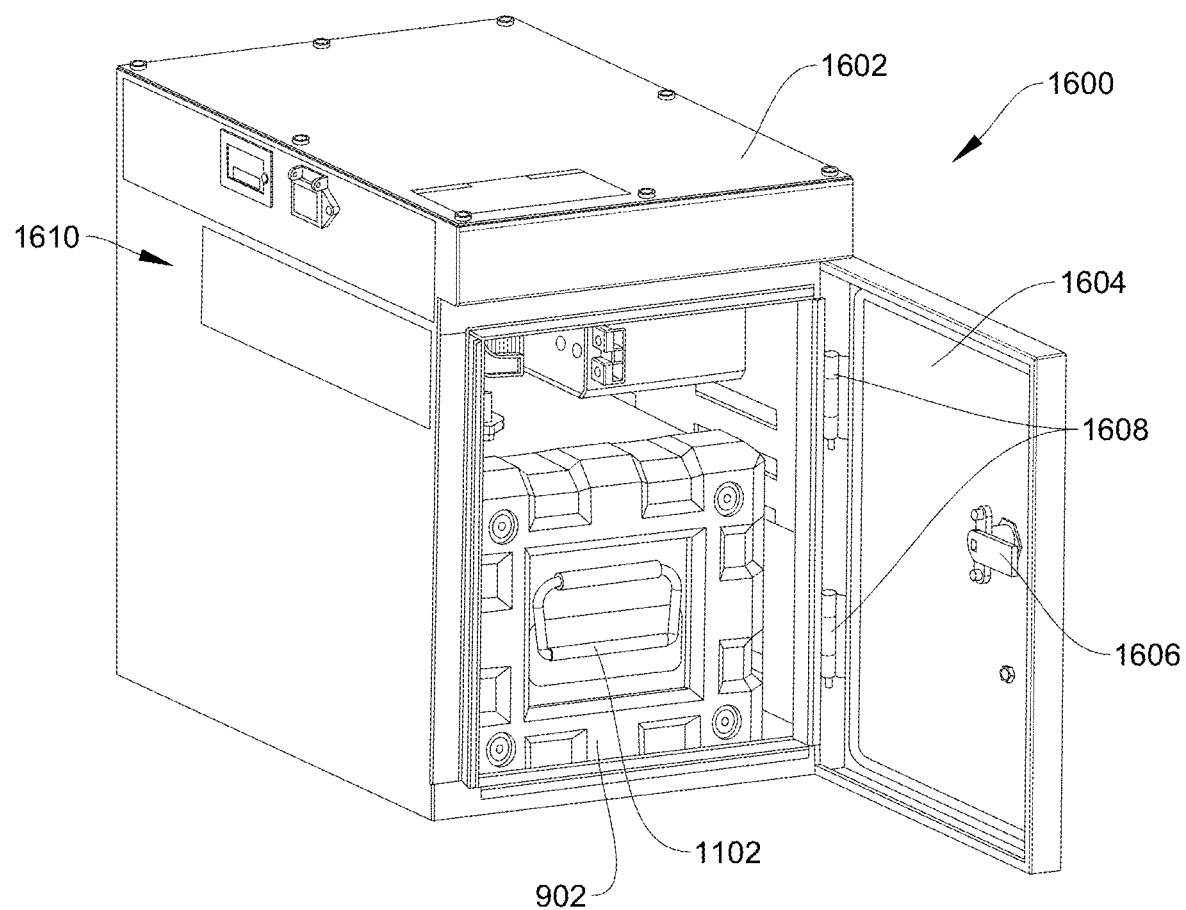
FIG. 16 is a perspective view of an alternative power module.

In another implementation of the present disclosure, a power module 1600 for powering a log splitter is shown in FIG. 16. The power module 1600 may be similar to the power module 200 described above. In FIG. 16, the power module 1600 may include a housing 1602 that defines an interior for storing a battery 902. A door 1604 may be pivotally or slidably coupled to the housing 1602. The door 1604 may be removably coupled to the housing 1602 in any manner. In FIG. 16, the door 1604 is pivotally coupled to the housing 1602 via one or more hinges 1608. The door 1604 may include a latch assembly 1606 for releasably coupling the door 1604 to the housing 1602. Moreover, a control panel or interface 1610 may be located on the housing 1602. The control panel or interface 1610 may include a plurality of buttons, switches, or other controls or displays. The controls may be used for controlling the operation of the battery 902 such as for selecting one of a plurality of different modes (e.g., power on, power off, reduced power mode, economy mode, etc.). One or more of the displays may display information about the battery including its state of charge and if it requires charging (e.g., its current charge is below a predefined threshold charge). One or more lights or audible alerts may be triggered from the control panel or interface 1610 if the charge level of the battery falls below a predefined threshold. Other control aspects are possible with the control panel or interface 1610. In one implementation, the control panel or interface 1610 may include the same buttons or controls as the control panel or interface 1000 shown in FIG. 12. In other implementations, the control panel or interface 1610 may include fewer or additional buttons, controls, and/or displays.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A log splitter, comprising:
    a frame;
    one or more wheels for supporting the frame;
    a tongue extending from the frame and including a hitch assembly;
    a hydraulic control system including a hydraulic pump and a control valve;
    an electric motor operably coupled to the hydraulic pump;
    a cutter mechanism configured to perform a cutting operation, the cutter mechanism operably controlled by the hydraulic control system to move between a retracted position and a cutting position; and
    a power module comprising a battery electrically coupled to the electric motor, a controller electrically powered by the battery, a housing for enclosing the battery, and a control interface including a battery charge level indicator, a charging port, and one or more controls;
    wherein the one or more controls comprises a power control and a mode control; and
    wherein, a movement of the cutter mechanism between the retracted position and cutting position is operably driven by the electric motor.

2. The log splitter of claim 1, wherein the mode control comprises an economy mode and a performance mode.

3. The log splitter of claim 1, wherein the hydraulic control system comprises a reservoir for holding hydraulic fluid, a hydraulic actuator coupled to the cutter mechanism, and the pump.

4. The log splitter of claim 3, wherein the control valve includes a first port, a second port, and a third port; and wherein the third port is a bypass port fluidly coupled to the reservoir.

5. The log splitter of claim 4, further comprising an operator control mechanism operably coupled to the control valve for controlling the control valve to direct hydraulic fluid from the pump to either the first port or the second port.

6. The log splitter of claim 5, wherein when the control valve is operably moved to direct hydraulic fluid to the first port, the cutter mechanism is actuated to move to the cutting position.

7. The log splitter of claim 5, wherein when the control valve is operably moved to direct hydraulic fluid to the second port, the cutter mechanism is actuated to move to the retracted position.

8. The log splitter of claim 3, wherein when the cutter mechanism is moved to the retracted position, the cutter mechanism is moved into a housing.

9. The log splitter of claim 1, further comprising a holder mechanism coupled to the frame for holding an object to be engaged by the cutter mechanism.

10. A log splitter operably configurable between a first configuration and a second configuration, the log splitter comprising:
    a frame comprising a first portion and a second portion;
    one or more wheels for supporting the frame;
    a tongue extending from the frame and including a hitch assembly;
    a hydraulic control system including a hydraulic pump and a control valve;
    an electric motor operably coupled to the hydraulic pump;
    a cutter mechanism configured to perform a cutting operation, the cutter mechanism operably controlled by the hydraulic control system to move between a retracted position and a cutting position;

a power module comprising a battery electrically coupled to the electric motor, a controller electrically powered by the battery, a housing for enclosing the battery, and a control interface including a battery charge level indicator, a charging port, and one or more controls;

a pivot located between the first portion and the second portion of the frame, the first portion being releasably pivotable relative to the second portion about the pivot;

wherein, the cutter mechanism is movably coupled to the first portion of the frame;

wherein, a movement of the cutter mechanism between the retracted position and cutting position is operably driven by the electric motor;

wherein the one or more controls comprises a power control and a mode control; and wherein, in the first configuration, the first portion is aligned coaxially or parallel to the second portion, and in the second configuration, the first portion is oriented perpendicularly with respect to the second portion.

11. The log splitter of claim 10, wherein the hydraulic control system comprises a reservoir for holding hydraulic fluid, a hydraulic actuator coupled to the cutter mechanism, and the pump, the hydraulic actuator being coupled to the first portion.

12. The log splitter of claim 10, further comprising a control valve including a first port, a second port, and a third port, the third port being a bypass port fluidly coupled to the reservoir, wherein the control valve is coupled to the first portion of the frame.

13. The log splitter of claim 12, further comprising an operator control mechanism operably coupled to the control valve for controlling the control valve to direct hydraulic fluid from the pump to either the first port or the second port.

14. The log splitter of claim 12, wherein when the control valve is operably moved to direct hydraulic fluid to the first port, the cutter mechanism is actuated to move to the cutting position.

15. The log splitter of claim 12, wherein when the control valve is operably moved to direct hydraulic fluid to the second port, the cutter mechanism is actuated to move to the retracted position.

16. A log splitter comprising:

a frame comprising a first portion and a second portion;

a pivot located between the first portion and the second portion of the frame, the first portion being releasably pivotable relative to the second portion about the pivot;

an electric motor operably coupled to an actuator;

a cutter mechanism comprising a wedge configured to perform a log splitting operation, the cutter mechanism operably controlled by the actuator to move between a retracted position and a cutting position; and a power module comprising a battery electrically coupled to the electric motor, a controller electrically powered by the battery, a housing for enclosing the battery, and a control interface including a battery charge level indicator, a charging port, and one or more controls;

wherein the one or more controls comprises a power control and a mode control; and wherein, a movement of the cutter mechanism between the retracted position and cutting position is operably driven by the electric motor.

* * * * *